United States Patent
Atalla

(10) Patent No.: US 11,360,216 B2
(45) Date of Patent: Jun. 14, 2022

(54) METHOD AND SYSTEM FOR POSITIONING OF AUTONOMOUSLY OPERATING ENTITIES

(71) Applicant: VoxelMaps Inc., San Francisco, CA (US)

(72) Inventor: Peter Atalla, London (GB)

(73) Assignee: VoxelMaps Inc., San Francisco, CA (US)

(*) Notice: Subject to any disclaimer, the term of this patent is extended or adjusted under 35 U.S.C. 154(b) by 0 days.

(21) Appl. No.: 16/191,453

(22) Filed: Nov. 15, 2018

(65) Prior Publication Data

US 2019/0162856 A1    May 30, 2019

Related U.S. Application Data

(60) Provisional application No. 62/592,381, filed on Nov. 29, 2017.

(51) Int. Cl.

| | | |
|---|---|---|
| *G01S 17/89* | (2020.01) | |
| *G06T 19/00* | (2011.01) | |
| *G01S 17/42* | (2006.01) | |
| *G01S 17/93* | (2020.01) | |
| *G05D 1/02* | (2020.01) | |
| *G06T 17/00* | (2006.01) | |
| *G05D 1/10* | (2006.01) | |
| *G01S 7/00* | (2006.01) | |

(52) U.S. Cl.
CPC ............ *G01S 17/89* (2013.01); *G01S 17/42* (2013.01); *G01S 17/93* (2013.01); *G05D 1/0231* (2013.01); *G05D 1/0276* (2013.01); *G06T 17/00* (2013.01); *G06T 19/003* (2013.01); *G01S 7/003* (2013.01); *G05D 1/101* (2013.01); *G05D 2201/0213* (2013.01)

(58) Field of Classification Search
CPC ...................................................... G01S 17/89
See application file for complete search history.

(56) References Cited

U.S. PATENT DOCUMENTS

| | | | |
|---|---|---|---|
| 8,108,901 | B2 | 1/2012 | Nicas et al. |
| 8,488,451 | B2 | 7/2013 | Wollmershauser et al. |
| 2009/0037810 | A1 | 2/2009 | Algreatly |
| 2009/0077114 | A1 | 3/2009 | Zachariah |

(Continued)

*Primary Examiner* — Imran K Mustafa
(74) *Attorney, Agent, or Firm* — Kanika Radhakrishnan; Evergreen Valley Law Group

(57) ABSTRACT

A method and system for positioning of autonomously operating entities are disclosed. A positioning system receives a current location of an entity capable of autonomous operation and generates a 3D virtual construct by splitting a spatial volume associated with the current location into a plurality of voxels. The positioning system receives spatial data corresponding to the current location generated by at least one sensor associated with the entity and determines an occupancy status of one or more voxels using the spatial data. A voxel map is configured from the 3D virtual construct based on the occupancy status of the one or more voxels. The positioning system generates a 3D map by overlaying visual semantic data onto the voxel map. The visual semantic data is derived from image frames corresponding to the current location captured by one or more imaging devices. The 3D map is capable of autonomously positioning the entity.

18 Claims, 8 Drawing Sheets

(56) References Cited

U.S. PATENT DOCUMENTS

| | | |
|---|---|---|
| 2014/0089459 A1 | 3/2014 | Werr |
| 2014/0368807 A1* | 12/2014 | Rogan ................... G01S 7/4808 |
| | | 356/28 |
| 2016/0154999 A1* | 6/2016 | Fan ........................... G06T 7/11 |
| | | 382/103 |
| 2017/0039222 A1* | 2/2017 | Farrow ................... G06F 16/29 |
| 2018/0058861 A1* | 3/2018 | Doria ....................... G06T 17/05 |
| 2018/0075643 A1* | 3/2018 | Sequeira ................. G06T 15/10 |
| 2018/0188044 A1 | 7/2018 | Wheeler |
| 2019/0189006 A1* | 6/2019 | Toma ................... G08G 1/0968 |

* cited by examiner

METHOD AND SYSTEM FOR POSITIONING OF AUTONOMOUSLY OPERATING ENTITIES

TECHNICAL FIELD

The present technology generally relates to the creation of high-definition (HD) mapping data, and more particularly, to a method and system for positioning of autonomously operating entities in real-world environments using HD mapping data.

BACKGROUND

An autonomously operating entity, such as an autonomous vehicle or a robot, may use a variety of sensor systems to sense its surrounding environment and position itself without human intervention. In a typical real-world environment, such entities may encounter any number of unforeseen objects in their path. For example, an autonomous car may encounter other vehicles, pedestrians, curbs, road signs and the like, on the road during navigation.

Generally, an autonomous car may include a Global Positioning System (GPS) device, Inertial Measurement Units (IMUs), cameras, Light Detection and Ranging (LiDAR) sensors, and the like, to collect information regarding its surrounding environment to generate three-dimensional (3D) representations of the surrounding environment. The data obtained from each of the different sensor types may be combined with Artificial Intelligence (AI) systems/models to recognize objects. Once an object is recognized, a bounding box is placed over the object and the dimensions and location of the bounding box (or the recognized object) is stored for subsequent positioning on a map. Thereafter, positioning of the autonomous car may be facilitated based on a localization framework obtained by triangulating positions from these known objects.

Generally, recognized objects are stored as simple bounding boxes on a 2D map. In environments with limited objects (such as country roads) localization can be very challenging as the bounding box objects may be sparse and beyond the reach of vehicle/robot sensors. Moreover, conventional techniques for autonomous positioning rely heavily on object recognition, which is a challenging task requiring costly sensors and expensive computers to run complex AI models. The object recognition models from point-clouds (i.e. information generated by LiDAR sensors) are especially complex and they need to be retrained for each new country where map data is collected and for each new LiDAR sensor manufacturer.

Accordingly, there is a need to facilitate positioning of autonomously operating entities while overcoming the aforementioned obstacles. More specifically, there is a need to create and update high-definition (HD) mapping data to facilitate autonomous positioning of vehicles, robots, and the like. Moreover, the HD mapping data needs to be created in substantially real-time to help facilitate autonomous positioning and navigation. Further, there is also a need to considerably reduce the complexity of object recognition from point-cloud data generated by LiDAR sensors.

SUMMARY

Various embodiments of the present invention provide a method and system for positioning of autonomously operating entities.

In an embodiment, a method for positioning of autonomously operating entities is disclosed. The method includes receiving, by a positioning system, a current location of an entity capable of autonomous operation. The method includes generating, by the positioning system, a three-dimensional (3D) virtual construct corresponding to the current location by splitting a spatial volume associated with the current location into a plurality of voxels. The method includes receiving, by the positioning system, spatial data corresponding to the current location generated by at least one sensor associated with the entity. The method includes determining, by the positioning system, an occupancy status of one or more voxels from among the plurality of voxels configuring the 3D virtual construct using the spatial data. The method includes configuring, by the positioning system, a voxel map from the 3D virtual construct based on the occupancy status of the one or more voxels. The method includes generating, by the positioning system, a 3D map by overlaying visual semantic data onto the voxel map. The visual semantic data is derived from image frames corresponding to the current location captured by one or more imaging devices associated with the entity. The 3D map is capable of autonomously positioning the entity.

In an embodiment, a positioning system for facilitating positioning of autonomously operating entities is disclosed. The positioning system includes at least one processing module, and a memory having stored therein machine executable instructions, that when executed by the at least one processing module, cause the positioning system to receive a current location of an autonomously operating entity. The positioning system is caused to generate a three-dimensional (3D) virtual construct corresponding to the current location by splitting a spatial volume associated with the current location into a plurality of voxels. The positioning system is caused to receive spatial data corresponding to the current location generated by at least one sensor associated with the autonomously operating entity. The positioning system is caused to determine an occupancy status of one or more voxels from among the plurality of voxels configuring the 3D virtual construct using the spatial data. The positioning system is caused to configure a voxel map from the 3D virtual construct based on the occupancy status of the one or more voxels. The positioning system is caused to generate a 3D map by overlaying visual semantic data onto the voxel map. The visual semantic data is derived from image frames corresponding to the current location captured by one or more imaging devices associated with the autonomously operating entity. The 3D map is capable of autonomously positioning the autonomously operating entity.

In an embodiment, an autonomously operating entity is disclosed. The autonomously operating entity includes a location determination unit, at least one sensor, one or more imaging devices and a positioning system. The location determination unit is configured to use signals received from one or more navigational satellites to determine a current location of the autonomously operating entity. The at least one sensor is configured to generate spatial data corresponding to the current location. The one or more imaging devices are configured to capture image frames corresponding to the current location. The positioning system is in operable communication with the location determination unit, the at least one sensor and the one or more imaging devices. The positioning system includes at least one processing module and a memory. The memory stores machine executable instructions therein, that when executed by the at least one processing module, cause the positioning system to generate a three-dimensional (3D) virtual construct corresponding to the current location by splitting a spatial volume associated with the current location into a plurality of voxels. The positioning system is caused to determine an occupancy status of one or more voxels from among the plurality of voxels configuring the 3D virtual construct using the spatial data. The positioning system is caused to configure a voxel map from the 3D virtual construct based on the occupancy status of the one or more voxels. The positioning system is caused to generate a 3D map by overlaying visual semantic data onto the voxel map. The visual semantic data is derived from the image frames. The positioning system is caused to autonomously position the autonomously operating entity using the 3D map.

Other aspects and example embodiments are provided in the drawings and the detailed description that follows.

BRIEF DESCRIPTION OF THE FIGURES

For a more complete understanding of example embodiments of the present invention, reference is now made to the following descriptions taken in connection with the accompanying drawings in which.

Figure 1:
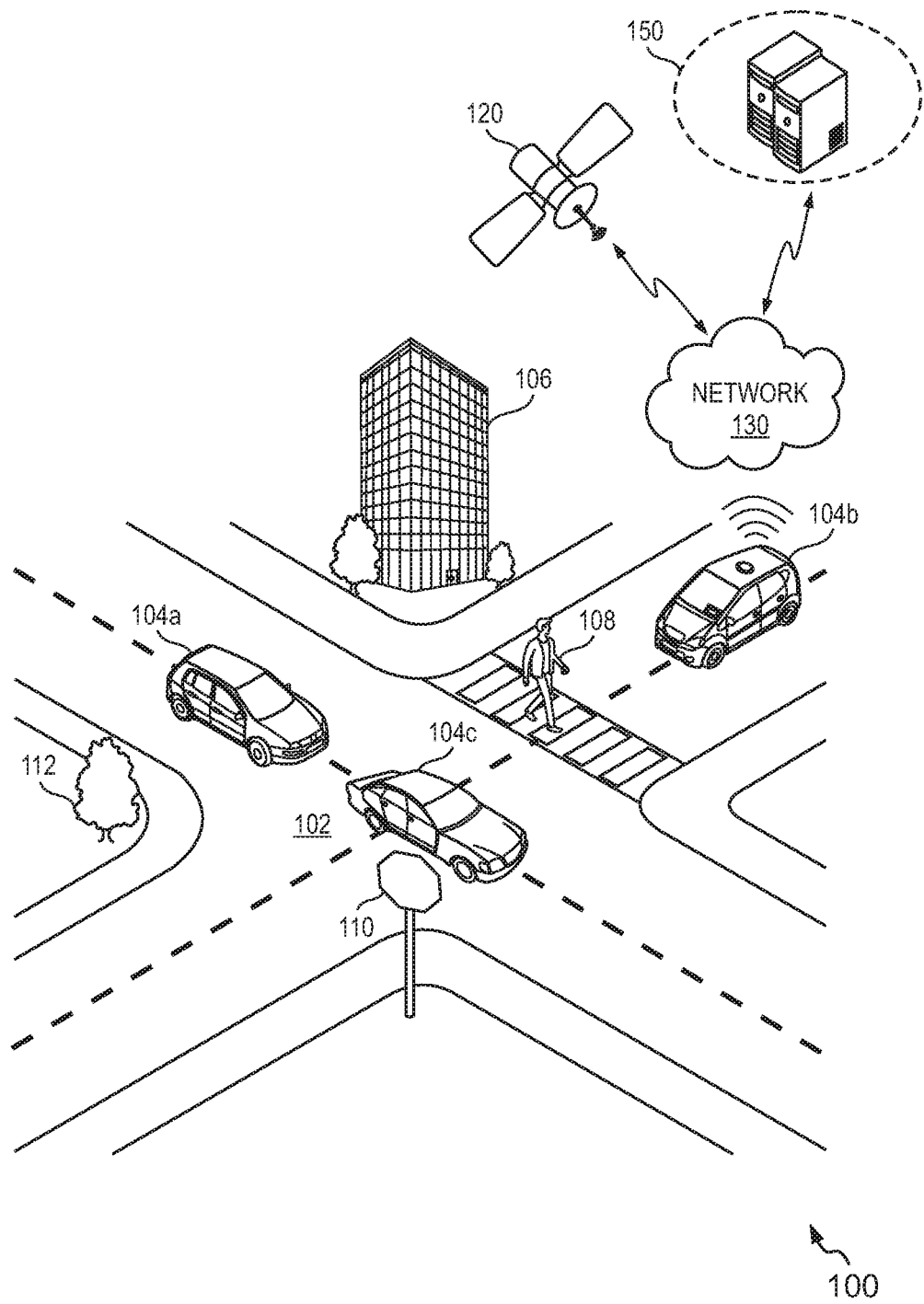
FIG. 1 shows a representation for illustrating a real-world environment of an autonomously operating entity, in accordance with an example embodiment of the invention.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present invention. It will be apparent, however, to one skilled in the art that the present invention can be practiced without these specific details.

Reference in this specification to "one embodiment" or "an embodiment" means that a particular feature, structure, or characteristic described in connection with the embodiment is included in at least one embodiment of the present invention. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the present invention is set forth without any loss of generality to, and without imposing limitations upon, the present invention.

Overview

Currently, high-definition map creation depends on point-cloud data generated by LiDAR sensors to recognize objects in the surrounding environment for positioning purposes. Point-clouds are a collection of points, which have an exact position in space, and they are created by transmitting lasers from LiDAR sensors and measuring the reflected laser light that is returned. The complexity comes from the huge amount of data needed to identify the object and the difficulty of training AI models to recognize different objects around the world. Further, the complexity of matching visual semantic data derived from image frames captured by visual sensors to spatial data generated by LiDAR sensors is very high.

Various embodiments of the present invention disclose techniques that are capable of overcoming the above-mentioned obstacles and providing additional advantages. More specifically, various embodiments of the present invention disclose a method and system for facilitating positioning of autonomously operating entities, such as vehicles, robots, drones, etc., in real-world environments.

In one embodiment, a positioning system is disclosed. The positioning system is configured to facilitate positioning of entities capable of autonomous operation, such as autonomous cars, robots, drones, and the like. An entity capable of autonomous operation is also referred to hereinafter as an autonomously operating entity.

In one embodiment, the positioning system is included within a remote server (also referred to herein as a server system) and is in operable communication with a plurality of autonomously operating entities. In one embodiment, the positioning system is included within an autonomously operating entity and is capable of facilitating positioning of the respective autonomously operating entity only. The positioning system in such a case may be in operable communication with the server system for autonomous positioning purposes.

In one embodiment, an autonomously operating entity includes a location determination unit, at least one sensor such as a LiDAR sensor, and one or more imaging devices such as cameras. In one embodiment, the location determination unit determines a current location of the autonomously operating entity using signals received from navigational satellites. For example, the location determination unit may correspond to a Global Positioning System (GPS) unit and, the GPS unit may triangulate signals received from three or more GPS satellites to determine current location of the autonomously operating entity. In one embodiment, the positioning system may receive the current location from the location determination unit.

The positioning system is configured to generate a three-dimensional (3D) virtual construct associated with a current location of the entity. The 3D virtual construct is configured by splitting a spatial volume associated with the current location into a plurality of voxels. The 3D virtual construct is also referred to herein as voxel mapping virtual construct. In at least one embodiment, the positioning system may store several such constructs corresponding to a plurality of regions (such as cities, states, countries, etc.).

In one embodiment, the voxel mapping virtual construct corresponds to a grid of voxels configured by splitting the spatial volume arranged in a fixed planetary grid into the plurality of voxels and each voxel in the grid is associated with a unique voxel identification information. More specifically, each voxel is associated with a permanent address and a position in a three-dimensional (3D) space. Though the term 'voxel' is typically understood as a 'three-dimensional form of a pixel' or a 'volume pixel', for purposes of the description, the term 'voxel' implies a cube of predefined dimension. Moreover, it is noted that voxel may be embodied in any resolution from a point to a cube of any size.

Initially, each voxel is associated with an unknown occupancy status. As LiDAR sensors mounted on either mapping vehicles or autonomously operating entities navigate the surrounding environment (on account of the vehicles/entities driving through the environment), the occupancy status of each voxel is defined based on spatial data generated by the LiDAR sensors. The occupancy status of each voxel may be defined based on a plurality of predefined categories. For example, the categories may include empty (e.g., free space), permanent (e.g., walls, curbs, buildings, road infrastructure etc.), temporary (e.g., road work barriers), transient (e.g., plant life, snow etc.) and moving (e.g., vehicles, pedestrians, animals etc.). More specifically, the occupancy status of each voxel may be determined to be one of an empty occupancy status, a permanent occupancy status, a temporary occupancy status, a transient occupancy status and a moving occupancy status based on the spatial data received from the LiDAR sensor.

The positioning system is configured to create a volumetric planetary map or a 'voxel map' using the occupancy status of the voxels. The term 'voxel map' as used herein implies a map/grid of voxels, with occupancy of one or more voxels defined as per one of the predefined categories specified above. In at least one example embodiment, the grid is an Earth-Centered-Earth-Fixed (ECEF) compliant occupancy grid, aligned with the planet axis. Moreover, each voxel in the grid is associated with a unique voxel identification information (i.e. unique Voxel ID or its global unique address), which is calculated from X, Y, Z coordinates received from a Global Navigation Satellite System (GNSS) receiver.

The voxel map is further refined using visual semantic data deduced from image frames captured by cameras mounted on either mapping vehicles or the autonomously operating entities. The updated voxel map is a high-definition (HD) 3D map of the planet capable of providing a localization framework to all forms of autonomously operating entities, including cars, trucks, aircrafts (drones), robots and the like, to localize their respective positions and help safely navigate their surrounding environments. The positioning system may provide the high-definition 3D maps to respective autonomously operating entities in response to receiving the current locations from the autonomously operating entities. The autonomously operating entities may thereafter position themselves in real-world environments using their respective 3D maps.

FIG. 1 shows a representation 100 for illustrating a real-world environment of an autonomously operating entity, in accordance with an example embodiment of the invention. The term 'autonomously operating entity' as used herein implies any entity capable of self-navigation without human intervention. Some examples of the autonomously operating entity include, but are not limited to, an autonomous car, a robot, a drone, and the like.

The exemplary real-world environment shown in the representation 100 corresponds to a busy road intersection 102. A plurality of cars, such as cars 104a, 104b and 104c are depicted to be navigating the road intersection 102. The real-world environment is further depicted to include a plurality of objects located near the road intersection 102, such as for example, a building 106, a pedestrian 108 crossing the pedestrian lane, a stop sign 110 and a tree 112. It is understood that the real-world environment is depicted to be a road intersection 102 for illustration purposes and that the real-world environment for an autonomously operating entity may not be limited to such a representation. It is noted that autonomously operating entities may navigate different types of land and aerial environments and accordingly, the real-world environments may differ for each autonomously operating entity. For example, for an autonomously operating robot, the real-world environment may correspond to an indoor space, such as a home or a factory floor workspace, whereas for an autonomously operating drone, the real-world environment may correspond to an aerial environment and it may have to navigate buildings, trees, and such other obstacles.

In an example scenario, the car 104b may correspond to an autonomous car (i.e. a car capable of navigating the roads without user intervention). The autonomous car 104b needs to recognize the objects in its path and the surrounding environment to position itself and safely navigate the real-world environment, such as the real-world environment shown in representation 100. In an embodiment, the autonomous car 104b may be equipped with a variety of electronic devices (not shown in FIG. 1) to facilitate autonomous positioning and navigation. For example, the autonomous car 104b may be equipped with a location determination unit, a plurality of sensors and one or more cameras to facilitate road navigation. Some non-exhaustive examples of the sensors may include LiDAR sensors, RADAR sensors, wheel speed sensor, inertial measurement units (IMUs) like gyroscope, and the like. In an example embodiment, the location determination unit may correspond to a geo-positioning unit capable of communicating with satellite based geo-positioning systems, like Global Positioning System (GPS), Global Navigation Satellite System (GLONASS), etc.

In at least some embodiments, the autonomous car 104b may include a navigation system (not shown in FIG. 1) capable of being in operable communication with a positioning system disposed in a remote server, such as the server system 150. The communication between the navigation system and the positioning system included within the server system 150 may be achieved over a communication network, such as the network 130. The network 130 may correspond to a cellular network, a public Wi-Fi network, a satellite network, and the like. In some embodiments, the positioning system may be deployed within the navigation system in the autonomous car 104b itself. In the case of the positioning system being deployed in the autonomous car 104b, the positioning system may receive one or more applications (or instances of applications) from the server system 150, over the network 130, for facilitating autonomous positioning of the autonomous car 104b. For example, the server system 150 may be configured to provide instance of applications like Voxel Addressing and Maps (VAM) application, Visual Semantic data Map Matching (VSMM) application, and Voxel based localization application to the autonomous car 104b for storage as in-dash software. The autonomous car 104b may use the applications to position and navigate surrounding environments as will be explained in further detail later.

In at least some example embodiments, the positioning system may be configured to receive a current location of the autonomous car 104b. In case of the positioning system included within the server system 150, the positioning system may receive the current location from the navigation system within the autonomous car 104b. The navigation system may in-turn receive the current location from a location determination unit, which may use signals received from three or more satellites (such as the satellite 120) and a triangulation technique to determine the current location. In case of the positioning system deployed within the autonomous car 104b, the positioning system may receive the current location directly from the location determination unit.

The positioning system is configured to generate a 3D virtual construct (also referred to herein as voxel mapping virtual construct) in response to receiving the current location of the autonomous car 104b. More specifically, the autonomous car's immediate environment (deduced from the current location of the car) is split into multi-resolution grid of voxels (i.e. cubes). The grid of voxels configuring the volumetric planet corresponding to the car's immediate environment is termed as the voxel mapping virtual construct. Each voxel in the grid of voxels is associated with a unique voxel identification information. More specifically, each voxel has a unique permanent address and location, which references a precise latitude, longitude and altitude.

Each voxel initially is associated with an unknown occupancy status. As either a mapping vehicle or the autonomous car 104b drives through the immediate environment, the LiDAR sensors may be configured to provide information, which may be used by the VAM application to define the occupancy status of each voxel. This creates an instant three-dimensional (3D) representation of the surrounding environment. Moreover, the semantic data deduced from image frames captured by imaging devices (i.e. cameras) may be overlaid on the voxels through the VSMM application, thereby creating a high-definition (HD) map in a fast and a very cost-effective way. The HD map may be used by the voxel-based localization application to facilitate positioning of the autonomous car 104b in real-world environments, such as the real-world environment depicted in the representation 100 in FIG. 1.

The creation of HD map data in substantially real-time (i.e. with minimal delay for example, a delay of a few microseconds to seconds) precludes the need to localize an autonomously operating entity, such as the autonomous car 104b, by triangulating from known bounding box objects, which may be sparse and beyond the reach of car sensors. The voxel map provides details of millions of voxels in the environment, which the autonomously operating entity can now localize from, resulting in a more accurate and more reliable position data. Furthermore, as this approach suggests mapping the occupancy status of the voxels, which can be achieved instantly in real time, it doesn't require any form of complex object recognition, thereby considerably reducing the complexity of object recognition using point-cloud data.

A positioning system facilitating creation and use of HD map data for autonomous positioning and navigation is explained hereinafter.

Figure 2A:
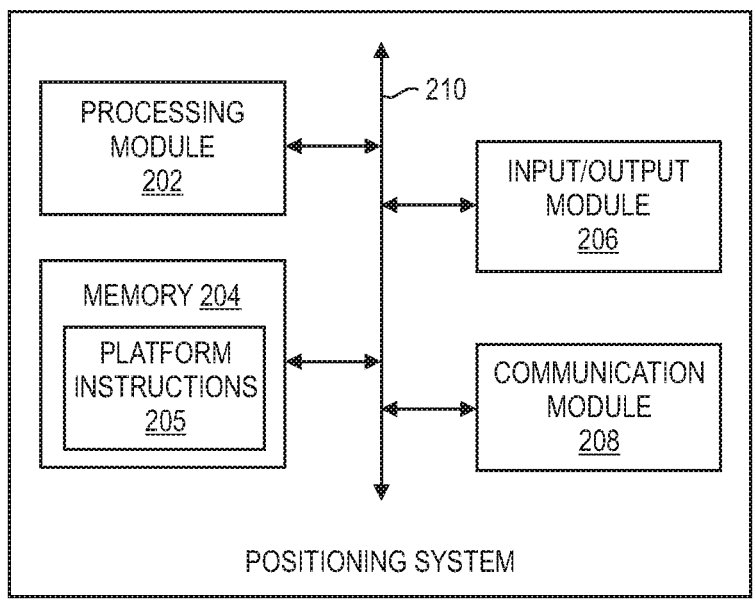
FIG. 2A is a block diagram representation of a positioning system configured to facilitate positioning of autonomously operating entities, in accordance with an example embodiment of the invention.

FIG. 2A is a block diagram representation of a positioning system 200 configured to facilitate positioning of an autonomously operating entity, in accordance with an example embodiment of the invention.

In one embodiment, the positioning system 200 may be included within a remote server, such as the server system 150 shown in FIG. 1. In one embodiment, the positioning system 200 may be included within the autonomously operating entity. As explained with reference to FIG. 1, an autonomously operating entity may correspond to an autonomous vehicle such as an autonomous car or truck, a robot, a drone, and the like. Such an autonomously operating entity may include therein a positioning system, such as the positioning system 200.

The positioning system 200 is depicted to include at least one processing module such as a processing module 202, a memory 204, and an input/output (I/O) module 206 and a communication module 208 for facilitating autonomous positioning (both land-based and aerial positioning) and navigation of the autonomously operating entities. It is noted that although the positioning system 200 is depicted to include only one processing module 202, the positioning system 200 may include more number of processing modules therein. In an embodiment, the memory 204 is capable of storing machine executable instructions (shown as platform instructions 205). Further, the processing module 202 is capable of executing the platform instructions. In an embodiment, the processing module 202 may be embodied as a multi-core processor, a single core processor, or a combination of one or more multi-core processors and one or more single core processors. For example, the processing module 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 202 may be configured to execute hard-coded functionality. In an embodiment, the processing module 202 is embodied as an executor of software instructions, wherein the instructions may specifically configure the processing module 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc) and BD (BLU-RAY® Disc).

In an embodiment, the memory 204 may store one or more applications, such as for example, a Voxel Addressing and Maps (VAM) application, a Visual Semantic data based Map Matching (VSMM) application, and a voxel-based localization application. The VAM application is configured to generate a voxel map from the voxel mapping virtual construct by defining occupancy of voxels (i.e. cubes) in the voxel mapping virtual construct based on information provided by LiDAR sensors mounted on a mapping vehicle or on an autonomously operating entity. The VSMM application facilitates overlaying of visual semantic data (derived from image frames received from cameras mounted on the mapping vehicle or the autonomously operating entity) on the voxel map to facilitate generation of high-definition (HD) maps. In one example embodiment, the image frames may be processed by object recognition algorithms to identify objects or identify visually similar objects and, such information may be overlaid on the voxel map to generate high-definition 3D maps. It is noted that the term 'high-definition maps' as used herein refers to a mapping images of high resolution, such as for example, a 720-pixel resolution or 1080-pixel resolution or any such resolution enabling clear identification of objects in the environment.

The voxel-based localization application uses the HD maps to facilitate localization of the autonomous car in its current environment and facilitate navigation of the autonomous car based on the localization. It is noted that the term 'localization of the surrounding environment' implies triangulating location from defined/identified objects in the surrounding real-world environment to facilitate autonomous positioning. The positioning system 200 may provide the high-definition 3D map to the autonomously operating entity for positioning and subsequent navigation in the real-world environment.

In one embodiment, the applications, such as the VAM, VSMM and/or the voxel-based localization application may be factory installed with an autonomously operating entity, like a vehicle. Alternatively, in some embodiments, the positioning system 200 within the autonomously operating entity may download an instance of the respective applications from the server system 150.

In an embodiment, the I/O module 206 may include mechanisms configured to receive inputs from and provide outputs to the user of the positioning system 200. In at least one example embodiment, the user of the positioning system 200 may correspond to a user of the server system 150 or a user of an autonomously operating entity. For example, if the positioning system 200 is deployed in an autonomous car, then the user of the autonomous car may be considered as the user of the positioning system 200 for purposes of description. The I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display such as User Interface (such as a light emitting diode display, a thin-film transistor (TFT) display, a liquid crystal display, an active-matrix organic light-emitting diode (AMOLED) display, etc.), a microphone, a speaker, a ringer, a vibrator, and the like.

The communication module 208 may include communication circuitry such as for example, a transceiver circuitry including antenna and other communication media interfaces to connect to a wired and/or wireless communication network. The communication circuitry may, in at least some example embodiments, enable transmission of data signals and/or reception of signals to and/or from remote entities. In one embodiment, the communication module 208 of the positioning system 200 included with the server system 150 facilitates communication with the navigation system included within the autonomously operating entity. In one embodiment, the communication module 208 of the positioning system 200 included with the autonomously operating entity facilitates communication, for example by using Application Programming Interface (API) calls, with other components included within the autonomously operating entity, such as for example, a location determination unit, sensors such as LiDAR sensors, one or more imaging devices, and the like.

In one embodiment, the communication module 208 may be configured to facilitate reception of current locations from the autonomously operating entities and provide respective high-definition 3D maps to the autonomously operating entities. Further, the communication module 208 may be configured to facilitate provisioning of one or more applications such as the VAM, the VSMM and voxel-based localization application to the autonomously operating entities.

The various components of the positioning system 200, such as the processing module 202, the memory 204, the I/O module 206 and the communication module 208 may be configured to communicate with each other via or through a centralized circuit system 210. The centralized circuit system 210 may be various devices configured to, among other things, provide or enable communication between the components (202-208) of the positioning system 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

In some embodiments, the centralized circuit system 210 may include appropriate storage interfaces to facilitate communication between the processing module 202 and the memory 204. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing module 202 with access to the applications stored in the memory 204.

Figure 2B:
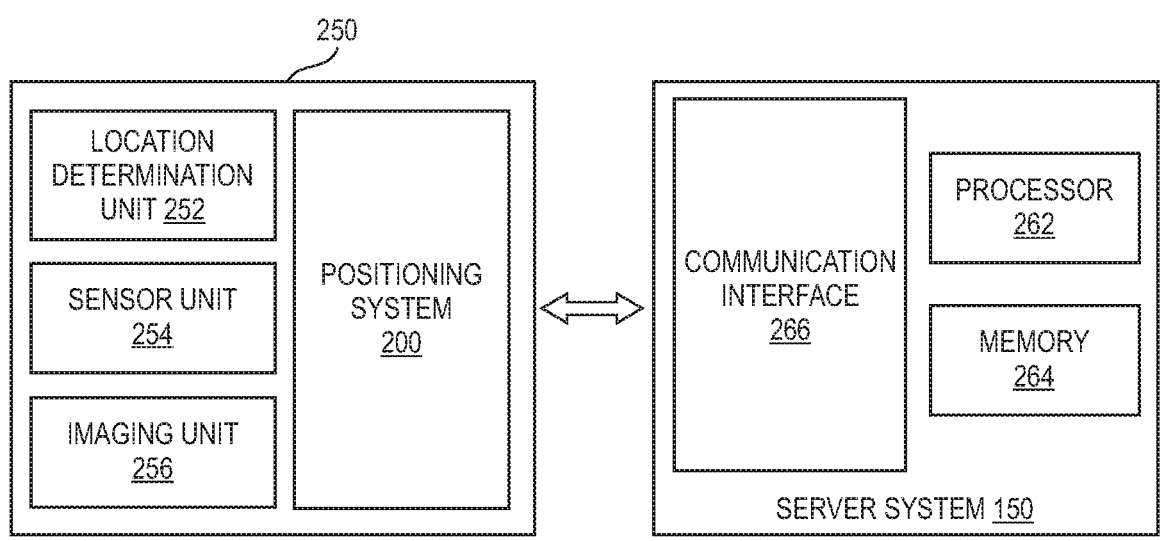
FIG. 2B is a block diagram representation of an autonomously operating entity in communication with a server system, in accordance with an example embodiment of the invention.

Referring now to FIG. 2B, a block diagram representation of an autonomously operating entity 250 in communication with the server system 150 is shown, in accordance with an example embodiment of the invention. As explained with reference to FIG. 2A, in some embodiments, the positioning system 200 may be included within an autonomously operating entity. Such a scenario is depicted in FIG. 2B. In such a case, the positioning system 200 may be in operative communication with the server system 150 to receive one or more applications from the server system 150 (shown in FIG. 1) for autonomously positioning the autonomously operating entity 250.

The autonomously operating entity 250 is depicted to include the positioning system 200 of FIG. 2A, a location determination unit 252, a sensor unit 254 and an imaging unit 256. It is understood that the autonomously operating entity 250 may include several other components than those depicted using blocks in FIG. 2B to facilitate autonomous operation. Moreover, it is noted that the positioning system 200 is in operable communication with other components within the autonomously operating entity 250 (such as the location determination unit 252, the sensor unit 254 and the imaging unit 256) and with the server system 150.

The location determination unit 252 is configured to determine a current location of the autonomously operating entity 250 using signals received from navigational satellites, such as a navigational satellite 120 shown in FIG. 1. In one embodiment, the location determination unit 252 may correspond to a Global Positioning System (GPS) unit and, the GPS unit may triangulate signals received from three or more GPS satellites to determine current location of the autonomously operating entity 250. In one embodiment, the positioning system 200 may receive the current location from the location determination unit 252.

The sensor unit 254 includes at least one sensor, such as a Light Detection and Ranging (LiDAR) sensor. The LiDAR sensor is one of a line-based LiDAR sensor and a Flash-based LiDAR sensor. The LiDAR sensor may be configured to transmit lasers and measure the reflected laser light that is returned, thereby capturing information related to objects and type of objects in a space surrounding the autonomously operating entity. Such information captured using the sensors (like the LiDAR sensors) is also referred to as spatial data.

The imaging unit 256 includes one or more imaging devices, such as an image sensor or a camera. The imaging devices may capture still image frames (i.e. individual images) or a sequence of image frames (for example, a video) of the surrounding environment as the autonomously operating entity 250 navigates the real-world environment. In at least one example embodiment, visual semantic data may be extracted from the image frames captured by the imaging devices.

The server system 150 is depicted to include at least one processor, such as the processor 262, a memory 264 and a communication interface 266. The processor 262, the memory 264 and the communication interface 266 are configured to perform processing, storage and communication functions, respectively. The processor 262, the memory 264 and the communication interface 266 may be embodied in a form as explained with reference to the processing module 202, the memory 204 and the communication module 208 (shown in FIG. 2A), respectively, and hence are not explained again herein.

In at least one example embodiment, the communication interface 266 is configured to be in operable communication with the communication module 208 (shown in FIG. 2A) of the positioning system 200. In one embodiment, the server system 150 may provision one or more applications, such as the VAM, the VSMM and the voxel-based localization application to the positioning system 200 using the communication interface 266. The positioning system 200 may receive the applications and store the applications in the memory 204 (shown in FIG. 2A).

It is noted that in some embodiments, a part of processing of sensor data and the imaging data for generation of voxel maps and 3D maps may be performed by the processor 262 using algorithms stored in the memory 264. For example, the configuration of the voxel mapping virtual constructs by splitting the spatial volume associated with the current locations may be performed by the processing module 202 of the positioning system 200 in conjunction with the processor 262 of the server system 150. Similarly, the overlaying of the visual semantic data onto the voxels maps may also be performed by the processing module 202 of the positioning system 200 in conjunction with the processor 262 of the server system 150.

As explained with reference to FIG. 2A, the positioning system 200 may receive a current location information of the autonomously operating entity 250 from the location determination unit 252. The processing module 202 of the positioning system 200 generates a 3D virtual construct (i.e. the voxel mapping virtual construct) corresponding to the current location. The voxel mapping virtual construct may be generated by splitting a spatial volume associated with the current location to configure a grid of voxels. The generation of the voxel mapping virtual construct is further explained with reference to FIG. 3.

Figure 3:
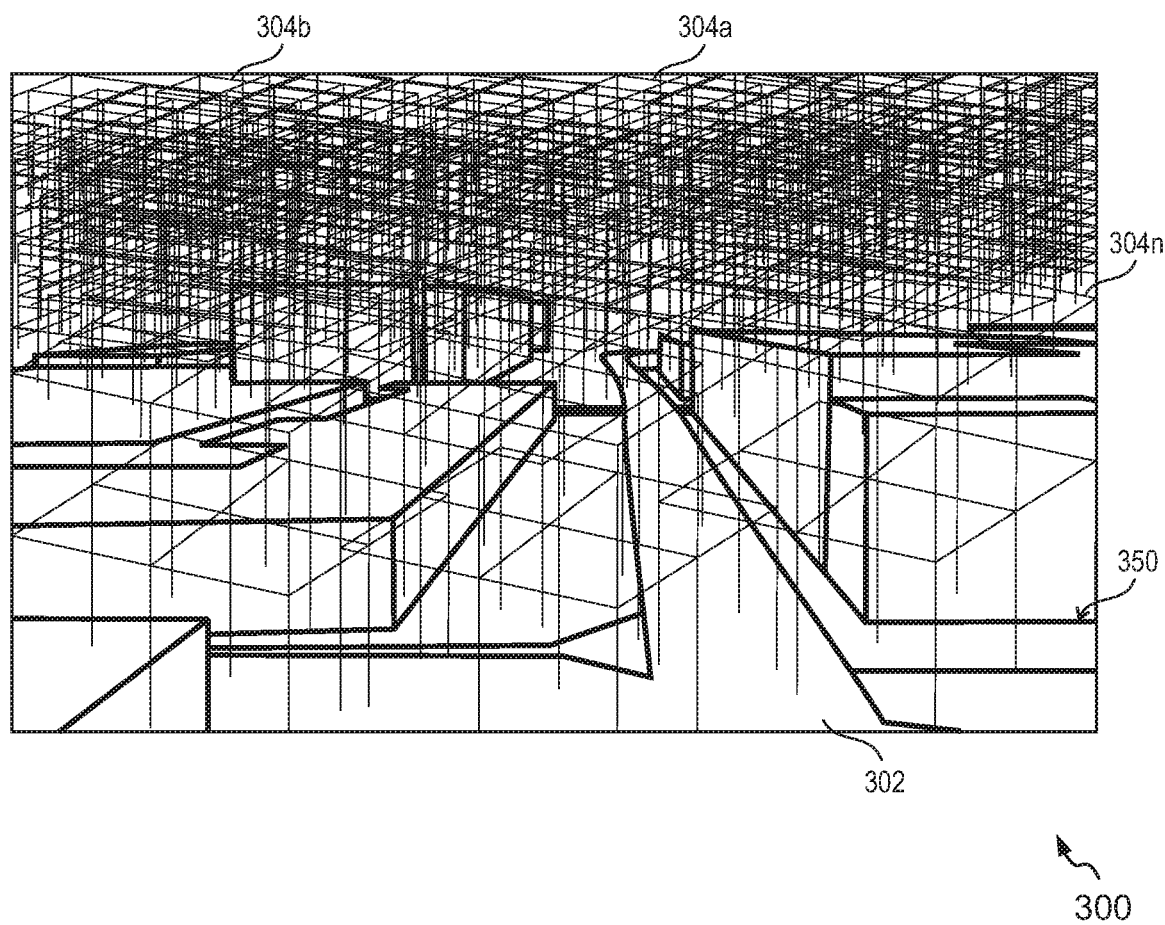
FIG. 3 shows a representation for illustrating a creation of an example voxel mapping virtual construct, in accordance with an example embodiment of the invention.

FIG. 3 shows a representation 300 for illustrating a generation of an example voxel mapping virtual construct, in accordance with an example embodiment of the invention. As explained with reference to FIG. 2B, the processing module 202 of the positioning system 200 is configured to generate a 3D virtual construct of the current location. The 3D virtual construct is also referred to herein as voxel mapping virtual construct. The generation of the voxel mapping virtual construct is explained hereinafter.

In an embodiment, three-dimensional (3D) images of a planet may be obtained by the processing module 202 of positioning system 200 from the imaging satellites. The term 'planet' as used herein refers to a region, such as for example, a particular locality, a city, a state, a country, and the like. The one or more 3D images of the region may be used to generate a planet volume, such as the planet volume 302, by extracting a subset of the images of the planet relevant to the current location. For example, images relevant to current location (such as for example, within a predefined radius of the current location) may be extracted to configure the planet volume 302. The planet volume 302 is exemplarily depicted to display a plurality of building structures, pathways, and the like.

The processing module 202 may further be configured to split the planet volume (also referred to herein as spatial volume) into millions of voxels (or cubes) in a computer manageable space to generate a voxel mapping virtual construct (i.e. a grid of voxels configuring the planet volume). The representation 300 exemplarily depicts a voxel mapping virtual construct 350 generated by the processing module 202 for the planet volume 302. As can be seen, the entire planet volume 302 is split into a grid of cubes or voxels, including voxels, such as voxel 304*a*, 304*b* . . . 304*n*. For each of these voxels, the processing module 202 is configured to assign a permanent address, which serves as a unique voxel identification information. In an example embodiment, the voxel address is referenceable at a center point, with latitude, longitude and altitude.

As explained with reference to FIG. 1, current location of the autonomously operating entity 250 (derived from the location determination unit 252) may be provided to the processing module 202. In response to the receipt of the current location, the processing module 202 may be configured to generate a voxel mapping virtual construct relevant for the area (i.e. an area including the current location of the autonomously operating entity 250). It is noted that the processing module 202 may not create a voxel mapping virtual construct corresponding to the entire planet (or entire region) for each receipt of the current location. As voxels are distinct units, the processing module 202 can create a subset of tiles or cubic tiles of the data as per request. Thereafter, a customized voxel mapping virtual construct for the desired location may be used by the processing module 202 to generate a high-definition 3D for positioning the autonomously operating entity 250.

In some embodiments, the processing module 202 may be configured to recursively split each voxel into smaller cubes or smaller voxels to configure a multi-resolution voxel structure. In one embodiment, the multi-resolution voxel structure may correspond to an Octatree (or Octree) structure. Such a multi-resolution structure may be used along with Bloom filters for reducing data size and to be computationally manageable. An example multi-resolution voxel structure is depicted in FIG. 4.

Figure 4:
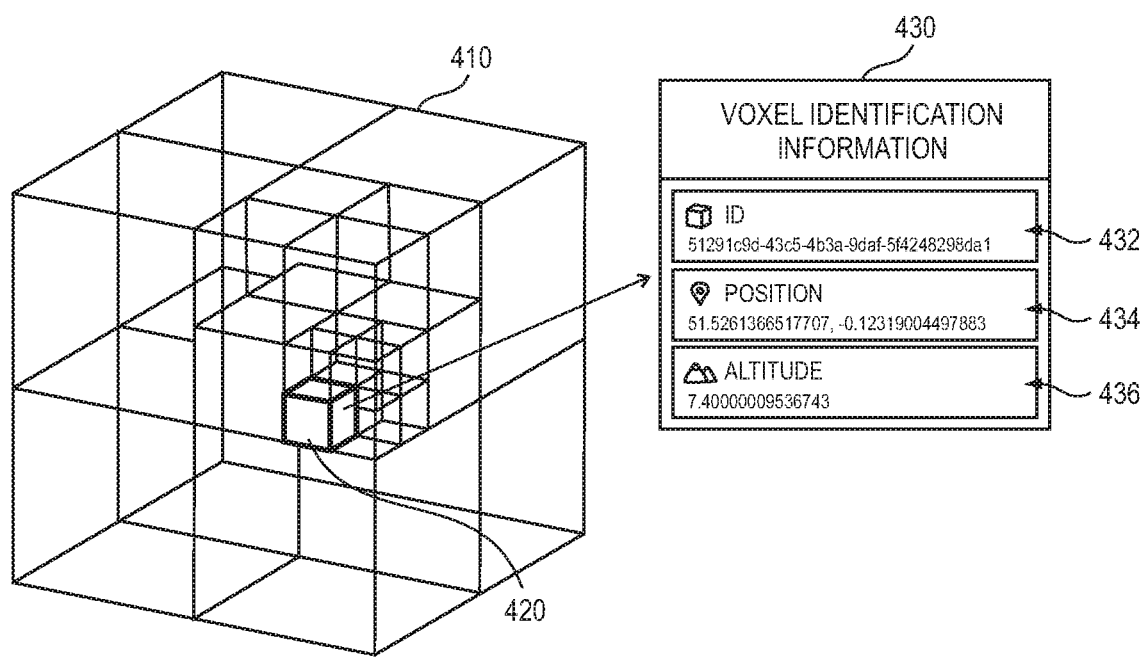
FIG. 4 shows a representation of a multi-resolution voxel structure, in accordance with an example embodiment of the invention.

FIG. 4 shows an example representation of a multi-resolution voxel structure, in accordance with an example embodiment of the invention. More specifically, FIG. 4 depicts a super voxel region 410. As explained with reference to FIG. 3, a planet volume may be split into voxels or voxel regions. One such voxel region of a planet volume is the super voxel region 410. As voxels are essentially cubes, they can be stored using an Octatree or an Octamap structure. More specifically, an Octree or Octatree is a tree data structure that is used to partition a three-dimensional space by recursively subdividing it into eight Octants. Thus, the super voxel region 410 may be split recursively into eight octants, in effect creating voxels of various sizes (i.e. a multi-resolution voxel structure). Accordingly, the multi-resolution voxel structure may include voxels of sizes ranging from 8×8×8 m to 8×8×8 cm. In one embodiment, each voxel address is referenceable at center point, with latitude, longitude and altitude. As the cubes/voxels can be stored in multi-resolution using the Octatree, any size of voxels can be used depending on the purpose.

Each voxel is assigned a permanent address using a multi-resolution hierarchy. Moreover, the processing module 202 (shown in FIG. 2A) may be configured to add sub-address parameters with a plurality of addressing points to localize the voxels/cubes at a very micro-level (for example, 0.1×0.1×0.1 m dimension). As shown, the unique voxel identification information 430 for a voxel 420 in the super voxel region 410 may be represented by a plurality of information fields 432, 434 and 436. The information field 432 shows a unique ID (Identification) of the voxel 420, the information field 434 shows position of the voxel 420 in terms of longitude and latitude information and the information field 436 shows an altitude of the voxel 420.

Such a multi-resolution voxel structure may help in reducing the amount of data stored for mapping the planet. In some embodiments, Bloom filters may also be used to reduce the amount of data stored for mapping the planet.

Referring now to FIG. 2A, in at least one embodiment, the processing module 202 (shown in FIG. 2A) of the positioning system 200 is configured to use the stored instructions associated with the VAM application (or place an API call for the VAM application) to determine occupancy status of the plurality of voxels using LiDAR data generated by the LiDAR sensor. The processing module 202 is then configured to create an actual version of volumetric planetary map using occupancy status of the plurality of voxels.

The processing module 202 is further configured to use the instructions associated with the VSMM application (or place an API call for the VSMM application) to perform matching of the visual semantic data obtained from the image frames of the surrounding environment captured by the visual sensors (i.e. cameras) with the spatial data received from the LiDAR sensor to generate a high-definition 3D map for positioning and navigation purposes.

The generation of high-definition 3D maps by the positioning system 200 for facilitating autonomous positioning is hereinafter explained with reference to an autonomously navigating car. It is noted that the HD maps created and updated by the positioning system 200 may similarly be used by other autonomously operating entities, such as trucks, drones, robots, etc., and/or by other sensors such as 4D Radar for positioning and navigation purposes.

Figure 5A:
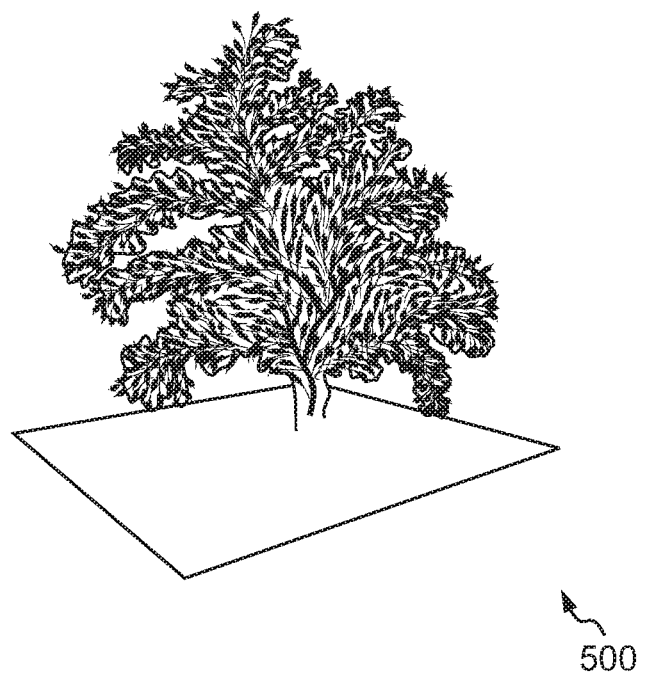
FIGS. 5A and 5B show an object in natural form and a voxel-based form for illustrating a creation of a HD 3D map, in accordance with an example embodiment of the invention.
Figure 5B:
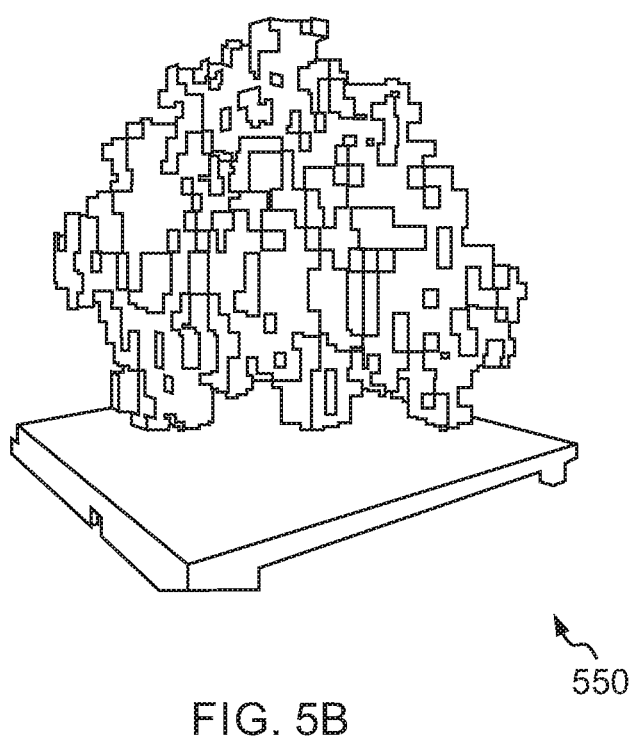

FIGS. 5A and 5B show an object in natural form and a voxel-based form for illustrating a generation of a high-definition 3D map, in accordance with an example embodiment of the invention. More specifically, FIG. 5A shows a tree 500 in its natural orientation as may be present on a travel route of an autonomous car (e.g., car 104b of FIG. 1). The processing module 202 of the positioning system 200 (shown in FIG. 2A) may be configured to split the tree 500 into a plurality of voxels, while splitting a planet volume including the tree 500. Initially an occupancy status of each voxel may be unknown. In one embodiment, LiDAR sensors when driven or flown (using drones or aircrafts) through the planet volume may generate data, which may be used to define the occupancy status of the voxels.

In one embodiment, the VAM application is configured to include program instructions for determining the occupancy status of the voxels. In one embodiment, the processing module 202 may be configured to retrieve previously collected LiDAR data for the corresponding planet volume and directly import the data into the VAM application to define the occupancy status of the voxels. However, in absence of such stored LiDAR data, the data generated from LiDAR sensors as the sensors traverse the planet volume, may be used for defining the occupancy status of the voxels.

In an example embodiment, the occupancy status of the voxels may be selected by the VAM application to be one of the following predefined categories:

Empty—Free space no matter

Permanent—Solid matter, permanent in time with high degrees of density (Such as walls, curbs, buildings, road infrastructure and the like)

Temporary—Solid matter, potentially temporary in nature (Such as road work barriers and the like)

Transient—Solid or Semi Solid Matter, which may vary with time and lower degrees of density (Such as plant life, snow and the like)

Moving—Solid matter, which is moving (Such as vehicles, bikes, people and the like).

It is noted that the definition of 'Temporary' relies on visual semantic data collected from visual sensors mounted on the autonomous car (or on a mapping vehicle). In an example embodiment, the processing module 202 may utilize methods such as Global Nearest Neighbor (GNN) and Kalman Filter (KF—point matching estimation for moving object tracking) for defining moving objects or use Deep Neural Networks to identify objects that might be temporary through recognition, i.e. temporary road works or temporary signs, etc.

In at least one embodiment, the communication module 208 of the positioning system 200 is configured to receive image frames of the surrounding environment from the plurality of cameras mounted on the autonomously operating entity. The received images are processed by the VSMM application to determine the visual semantic data from the captured images. The processing module 202 is configured to perform matching of visual semantic data with spatial data received from the LiDAR sensor to further define the objects. In one embodiment, addition of visual semantic data is performed in a cloud platform using images received from the visual sensors/cameras. It is understood that visual semantic data adds more information about what a particular voxel is, i.e., if it is a building, a road sign, a traffic light, or the like.

As explained above, the occupancy status of each voxel configuring the tree 500 (shown in FIG. 5A) may be determined and augmented with visual semantic data received from cameras to create a voxel-based representation of the object, such as the representation 550 shown in FIG. 5B. Similarly, all objects in the planet volume may be etched out to create a HD three-dimensional representation of the planet volume. The HD three-dimensional representation may be used by the voxel-based localization application to localize the surrounding environment of the autonomous car and thereafter enable the autonomous car to autonomously navigate the real-world environment.

Figure 6:
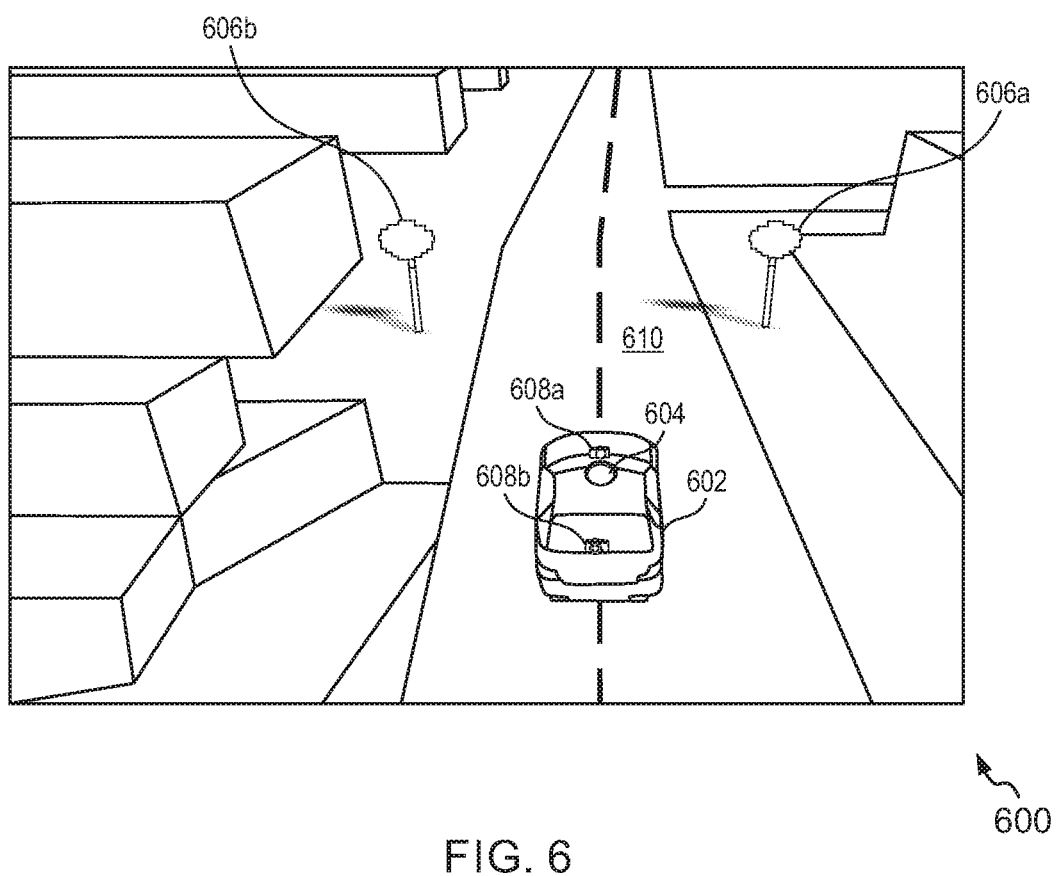
FIG. 6 shows a representation for illustrating a positioning of an autonomous vehicle in a real-world environment, in accordance with an example embodiment of the invention.

FIG. 6 shows an example representation 600 for illustrating an example positioning of an autonomous vehicle 602 in a real-world environment, in accordance with an example embodiment of the invention. A LiDAR sensor 604 is depicted to be mounted on the rooftop of the autonomous car 602 (hereinafter referred to as car 602). Furthermore, cameras 608a and 608b are depicted to be mounted on body of the car 602. The car 602 is depicted to be driving on a road 610. The representation 600 further shows road signs (for example, stop signs) 606a and 606b installed on each side of the road 610.

As explained with reference to FIGS. 2A to 5B, a navigation system included within the car 602 may send a current location to the positioning system 200 (shown in FIG. 2A) included a remote server system, such as the server system 150 (shown in FIG. 1). In response, the positioning system 200 may create a voxel mapping virtual construct (i.e. a grid of voxels configuring the surrounding planet). The occupancy of each voxel in the voxel mapping virtual construct may initially be unknown. As the car 602 continues its journey on the road 610, the LiDAR sensor 604 captures information (LiDAR spatial data) related to the surrounding environment. For example, the LiDAR sensor 604 may capture information related to the road signs 606a, 606b in real time and send this information to the positioning system 200. The processing module 202 of the positioning system 200 may define the occupancy of the voxels related to the road signs 606a, 606b as 'permanent nature with solid matter having high degrees of density' based on the LiDAR data. The visual imagery captured by the cameras 608a and 608b may further be used to determine visual semantic data by the VSMM application. The VSMM application may then be configured to overlay the visual semantic data on the voxels to generate a 3D representation of the objects, such as the 3D representation of the road signs 606a and 606b shown in FIG. 6. It is noted that only the voxel-based 3D representation of the road signs 606a and 606b are depicted in FIG. 6 for illustration purposes. It is noted that all objects in the surrounding environment may similarly be split into voxels, the occupancy of the voxels defined using LiDAR data and the visual semantic data overlaid on the voxels to create HD three-dimensional representation of the objects in real-time or substantially real-time. The updated high-definition 3D map is shared by the positioning system 200 with the car 602 using which the car 602 can position itself accurately on the road 610. In some embodiments, the voxel-based localization application may further facilitate localizing the positioning of the car 602 and assist the car 602 in navigating the surrounding environment.

In an embodiment, the LiDAR sensor 604 may correspond to a line-based LiDAR system or a Flash-based LiDAR system. It is noted that a LiDAR sensor is effectively a light-based version of Radar and it returns an image, which is made up of laser points, which have been reflected off objects. The image with laser points provides distance information (which is not available from images captured from cameras mounted on the autonomous vehicles) allowing an accurate 3D image to be produced. It is also noted that the images with data points appear different depending on the type of LiDAR sensor and the resolutions being used. For example, an image prepared using a 16-line LiDAR system may look different than an image prepared using a 64-line LiDAR system. Therefore, the conventional AI systems utilized for typically recognizing objects need to be trained several times to recognize the images/patterns produced for each object by each different sensor. This is a time consuming and complex procedure requiring a very high computational power and storage capacity. In contrast, the processing module 202 of the present invention is configured to utilize LiDAR data received from the LiDAR sensor 604 only for validating the occupancy status of the voxels. As this approach is only about mapping the occupancy status of the voxels this can be achieved instantly in real time and it doesn't require any form of object recognition. This approach further provides flexibility of using any type of calibrated LiDAR sensor without requiring the underlying AI to be retrained. Further, the 3D volumetric planetary map can be created using very low-power computer system.

Figure 7:
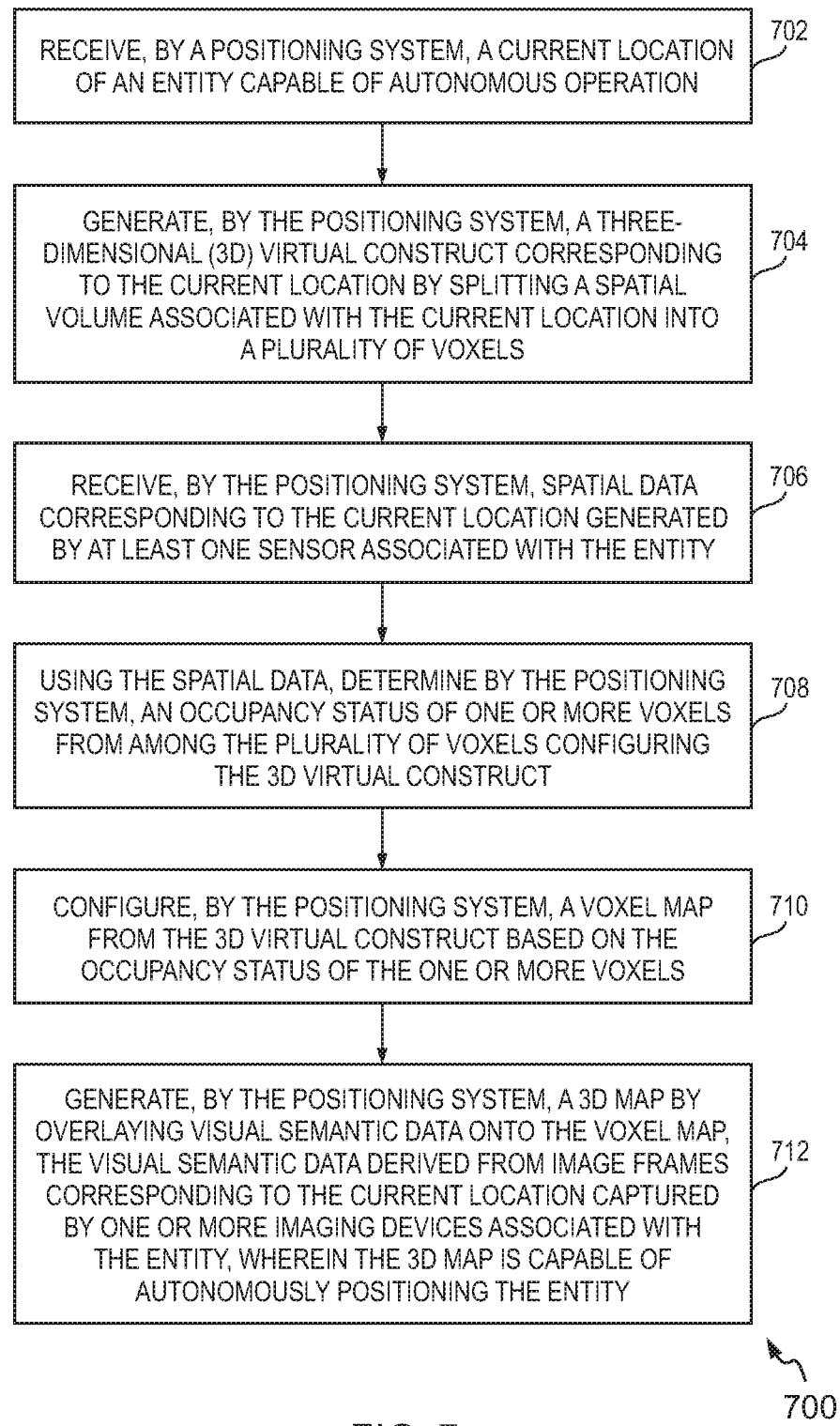
FIG. 7 is a flow diagram of a method for facilitating autonomous positioning of an entity, in accordance with an example embodiment of the invention.

FIG. 7 is a flow diagram of a method 700 for facilitating autonomous positioning of an entity, in accordance with an example embodiment of the invention. The various steps and/or operations of the flow diagram, and combinations of steps/operations in the flow diagram, may be implemented by, for example, hardware, firmware, a processor, circuitry and/or by the positioning system 200 explained with reference to FIGS. 1 to 6, and/or by a different electronic device associated with the execution of software that includes one or more computer program instructions. The method 700 starts at operation 702.

At operation 702, the method 700 includes receiving, by a positioning system such as the positioning system 200 explained with reference to FIGS. 2A to 6, a current location of an entity capable of autonomous operation. The entity capable of autonomous operation is also referred to hereinafter as autonomously operating entity. Some examples of the autonomously operating entity include, but are not limited to, an autonomous vehicle, a robot, a drone, and the like.

At operation 704, the method 700 includes generating, by the positioning system, a three-dimensional (3D) virtual construct corresponding to the current location by splitting a spatial volume associated with the current location into a plurality of voxels. The 3D virtual construct, also referred to as voxel mapping virtual construct, is configured by splitting a spatial volume associated with the current location into a plurality of voxels. As explained with reference to FIG. 3, the voxel mapping virtual construct is generated by splitting a planet (i.e. a region) into a plurality of voxels with permanent locations and positions in space. For example, the planet 302 of FIG. 3 is split into a plurality of voxels (cubes) to create the voxel mapping virtual construct (shown as voxel mapping virtual construct 350 in FIG. 3) by a processing module such as the processing module 202 of the positioning system 200 of FIG. 2A.

In some embodiments, the voxel mapping virtual construct may correspond to a multi-resolution voxel structure created using an Octamap and/or Bloom filter approach. As explained with reference to FIG. 4, the multi-resolution voxel structure may be created for reducing data size and to be computationally manageable. Each voxel in the multi-resolution voxel structure may be associated with a unique voxel identification information, i.e. with a permanent address and a position in a three-dimensional (3D) space.

At operation 706, the method 700 includes receiving, by the positioning system, spatial data corresponding to the current location generated by at least one sensor associated with the entity. An example of the at least one sensor is a Light Detection and Ranging (LiDAR) sensor. The LiDAR sensor may be embodied as one of a line-based LiDAR sensor and a Flash-based LiDAR sensor. The LiDAR sensor is configured to transmit lasers and measure the reflected laser light that is returned, thereby capturing information related to objects and type of objects in a space surrounding the autonomously operating entity. Such information captured using the sensors (like the LiDAR sensors) is also referred to as spatial data.

At operation 708, the method 700 includes determining, by the positioning system, an occupancy status of one or more voxels from among the plurality of voxels configuring the 3D virtual construct. The occupancy status of the one or more voxels is determined using spatial data received from the at least one sensor. In one embodiment, an occupancy status of each of the plurality of voxels is determined using LiDAR data generated by the LiDAR sensor. A voxel addressing and maps (VAM) application may be configured to facilitate the determination of the occupancy of the voxels. In an embodiment, an online version of the VAM application may be configured to use previously collected LiDAR data by the LiDAR sensor to determine occupancy status of the plurality of voxels. The VAM application may be configured to select the occupancy of each voxel from one of the following predefined categories: 'Empty', 'Permanent', 'Temporary', 'Transient' and 'Moving' based on the degree of density detected. More specifically, the occupancy status of each voxel may be determined to be one of an empty occupancy status, a permanent occupancy status, a temporary occupancy status, a transient occupancy status and a moving occupancy status based on the spatial data generated by the LiDAR sensor.

At operation 710, the method 700 includes configuring, by the positioning system, a voxel map from the 3D virtual construct based on the occupancy status of the one or more voxels. More specifically, the positioning system is configured to create a volumetric planetary map or a 'voxel map' using the occupancy status of the voxels.

At operation 712, the method 700 includes generating, by the positioning system, a 3D map by overlaying visual semantic data onto the voxel map. The visual semantic data is derived from image frames captured by one or more imaging devices associated with the entity. More specifically, visual semantic data deduced from images received from the visual sensors (i.e. cameras) is overlaid on the plurality of voxels of the voxel map to create HD volumetric planetary map in 3D. In an embodiment, visual semantic data is overlaid on the voxels of the voxel map by using a visual semantic data map matching (VSMM) application. In an embodiment, after adding the visual semantic data, the positioning system may be configured to export data in various third-party formats such as, but not limited to, traditional HD building box method and encode the data into Navigation Data Standards (NDS). In one embodiment, the positioning system is configured to create the map for the autonomously operating entity that may be a land-based vehicle or an aerial based vehicle.

In one embodiment, the positioning system is configured to share the high-definition 3D map with the autonomously operating entity to facilitate positioning of the autonomously operating entity. In an example embodiment, the high-definition 3D map can be shared with the autonomous vehicle by creating a local sub-set of the data for a particular area using the cubic tiles. In one example embodiment, the autonomously operating entity may use a voxel-based localization application to localize itself in an environment using the HD map and then use the LiDAR sensor to position itself during an on-going journey.

The method 700 ends at 712.

Figure 8:
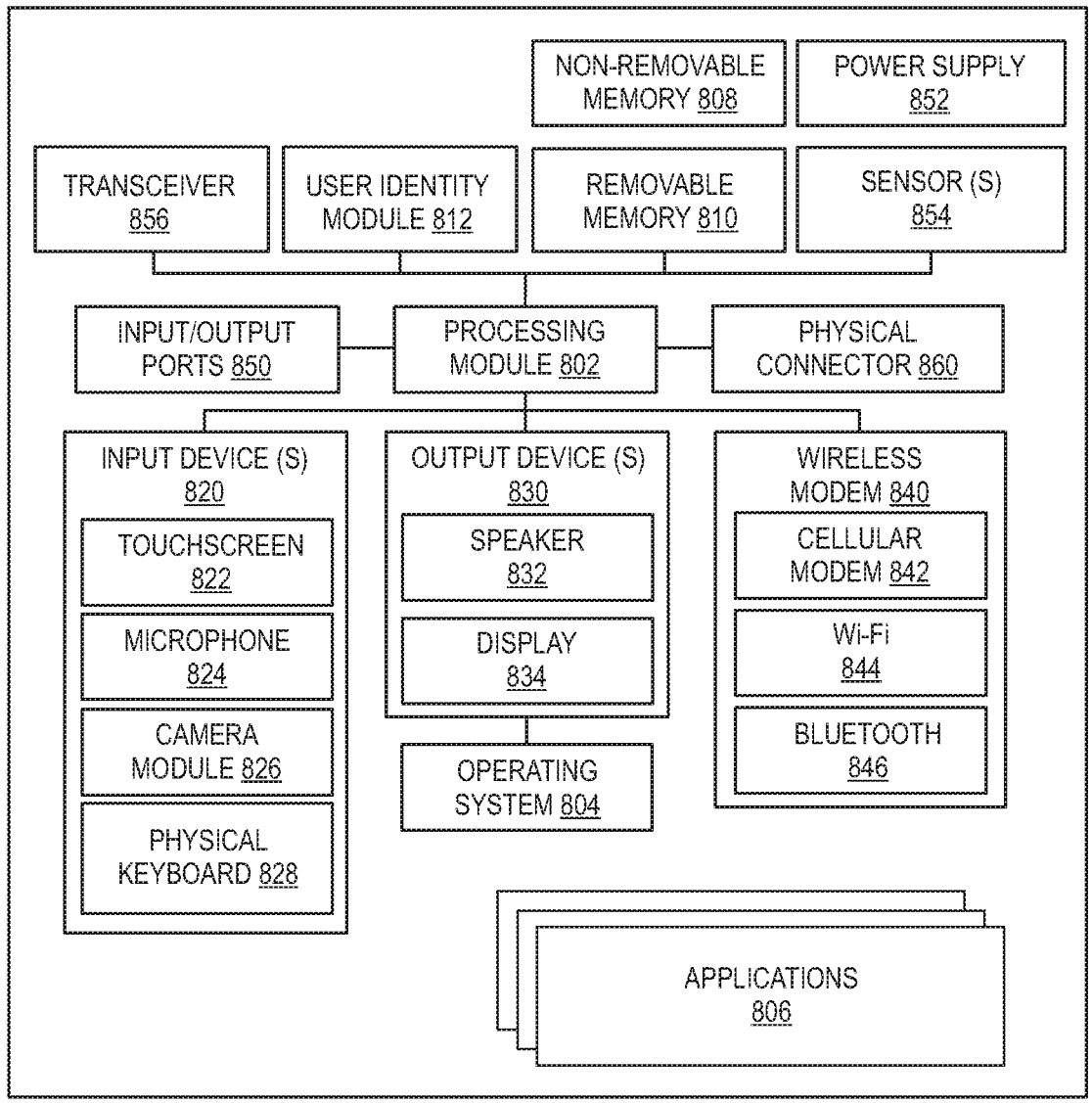
FIG. 8 shows simplified block diagram of an electronic device in accordance with an example embodiment of the invention.

FIG. 8 shows simplified block diagram of an electronic device 800 in accordance with an example embodiment of the invention. The electronic device 800 may correspond to positioning system 200 explained with reference to FIGS. 1 to 6, or, the server system 150 explained with reference to FIGS. 1 to 6. The electronic device 800 is depicted to include a plurality of applications 806 which may include applications, such as VAM, VSMM and voxel-based localization application.

It should be understood that the electronic device 800 as illustrated and hereinafter described is merely illustrative of one type of device and should not be taken to limit the scope of the embodiments. As such, it should be appreciated that at least some of the components described below in connection with that the electronic device 800 may be optional and thus in an example embodiment may include more, less or different components than those described in connection with the example embodiment of the FIG. 8. As such, among other examples, the electronic device 800 could be any of an electronic device, for example, in-dash electronic system, a Web server or a computing device, such a cellular phone, a tablet computer, a laptop, a mobile computer, a personal digital assistant (PDA), or any combination of the aforementioned, and other types of communication or multimedia devices.

The illustrated electronic device 800 includes a controller or a processing module 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and support for one or more applications programs (for example, the VAM, the VSMM and voxel-based localization application), that implements one or more of the innovative features related to autonomous positioning of entities described herein. The applications 806 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 800 includes one or more memory components, for example, a non-removable memory 808 and/or a removable memory 810. The non-removable memory 808 and/or the removable memory 810 may be collectively known as database in an embodiment. In at least one example embodiment, the memory components of the electronic device 800 may be configured to store one or more 3D virtual constructs and high-definition 3D maps for a plurality of regions.

The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA2000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images of surrounding environment) and a physical keyboard 828. Examples of the output devices 830 may include but are not limited to a speaker 832 and a display 834. The display 834 may be configured to display UIs associated with a real-time navigation application. Other possible output devices can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processing module 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 such as LiDAR sensors, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

Various example embodiments offer, among other benefits, techniques for facilitating positioning and navigation of autonomously operating entities, such as cars, trucks and drones, and autonomous robots in real-world environments. The positioning system enables creation of a permanent addressing and mapping framework, from which the high definition maps are built that are globally referenceable. The need of retraining the AI models to recognize road objects for every specific country is eliminated, as at a very first step, the whole planet is transformed into a plurality of multi-resolution cubes with a unique permanent address and location. The complexity of object recognition from the huge amount of point-cloud data generated by the conventional LiDAR sensor is effectively reduced as the LiDAR sensor is used only to validate the occupancy status determined by the positioning system of present invention. Additionally, rather than localizing an autonomous vehicle by triangulating method from known bounding box objects, which may be sparse and beyond the reach of the sensors of the autonomous vehicle, the voxel based volumetric planetary map provides details of the plurality of voxels in the environment, which the autonomous vehicle can localize from, resulting in a more accurate and more reliable position. The positioning system is further capable of providing a more accurate form of localizing autonomously operating entities in real world environments, particularly in environments, which may be information spare with limited road objects.

Although the invention has been described with reference to specific exemplary embodiments, it is noted that various modifications and changes may be made to these embodiments without departing from the broad spirit and scope of the invention. For example, the various operations, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the various 3D map generation applications and their various functionalities may be enabled using software and/or using transistors, logic gates, and electrical circuits (for example, integrated circuit circuitry such as ASIC circuitry). Various embodiments of the invention may include computer program products, i.e. one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising:
receiving, by a positioning system, a current location of an entity capable of autonomous operation;
generating, by the positioning system, a three-dimensional (3D) virtual construct corresponding to the current location by splitting a spatial volume associated with the current location into a plurality of voxels, wherein each of the plurality of voxels is assigned a permanent address using a multi-resolution hierarchy, which serves as a unique voxel identification information, wherein each permanent address is referenceable at a centre point, with a latitude, a longitude, and an altitude, and wherein the unique voxel identification information is represented by a plurality of information fields, wherein the plurality of information fields list a unique identification, latitude and longitude and altitude of each voxel separately;
recursively splitting, by the positioning system, each voxel from among the plurality of voxels to configure the multi-resolution voxel structure, wherein the multi-resolution voxel structure is created using a Bloom filter approach for reducing data size;
receiving, by the positioning system, spatial data corresponding to the current location generated by at least one sensor associated with the entity;
using the spatial data, determining by the positioning system, an occupancy status of one or more voxels from among the plurality of voxels configuring the 3D virtual construct, wherein the occupancy status of each voxel is determined from plurality of predefined categories based on the degree of density detected, wherein the occupancy status is determined from plurality of predefined categories comprising: an empty occupancy status for free space with no matter, a permanent occupancy status for solid matter that is permanent in time with high degrees of density, a temporary occupancy status for solid matter that is temporary in nature, a transient occupancy status for solid or semi solid matter, that varies with time and has lower degrees of
density, and a moving occupancy status for moving objects based on the spatial data received from the at least one sensor;
configuring, by the positioning system, a voxel map from the 3D virtual construct based on the occupancy status of the one or more voxels; and
generating, by the positioning system, a 3D map by overlaying visual semantic data onto the voxel map, the visual semantic data derived from image frames corresponding to the current location captured by one or more imaging devices associated with the entity, wherein the 3D map is capable of autonomously positioning the entity.

2. The method as claimed in claim 1, further comprising:
providing, by the positioning system, the 3D map to the entity for facilitating the autonomous positioning of the entity, wherein the 3D map corresponds to a high definition 3D map capable of being dynamically updated to facilitate the autonomous positioning of the entity in substantially real-time.

3. The method as claimed in claim 2, wherein the entity is configured to:
localize a surrounding environment associated with the current location using the 3D map; and
autonomously navigate the surrounding environment based on the localization of the surrounding environment.

4. The method as claimed in claim 1, wherein the current location is determined by a location determination unit associated with the entity, the current location determined using signals received from one or more navigational satellites.

5. The method as claimed in claim 1, wherein the 3D virtual construct corresponds to a grid of voxels configured by splitting the spatial volume into the plurality of voxels.

6. The method as claimed in claim 1, wherein the occupancy status of each voxel is determined from plurality of predefined categories comprising: an empty occupancy status, a permanent occupancy status, a temporary occupancy status, a transient occupancy status and a moving occupancy status based on the spatial data received from the at least one sensor.

7. The method as claimed in claim 1, wherein a sensor from among the at least one sensor corresponds to a Light Detection and Ranging (LiDAR) sensor and, wherein the LiDAR sensor is one of a line-based LiDAR sensor and a Flash-based LiDAR sensor.

8. The method as claimed in claim 7, wherein overlaying the visual semantic data onto the voxel map comprises matching of the visual semantic data with the spatial data received from the LiDAR sensor to define one or more objects present in the current location.

9. The method as claimed in claim 1, wherein the entity capable of autonomous operation corresponds to one of an autonomous vehicle, a robot and a drone.

10. A positioning system for facilitating positioning of autonomously operating entities, the positioning system comprising:
at least one processing module; and a memory having stored therein machine executable instructions, that when executed by the at least one processing module, cause the positioning system to:

receive a current location of an autonomously operating entity;

generate a three-dimensional (3D) virtual construct corresponding to the current location by splitting a spatial volume associated with the current location into a plurality of voxels, wherein each of the plurality of voxels is assigned a permanent address using a multi-resolution hierarchy, which serves as a unique voxel identification information, wherein each permanent address is referenceable at a centre point, with a latitude, a longitude, and an altitude, and wherein the unique voxel identification information is represented by a plurality of information fields, wherein the plurality of information fields list a unique identification, latitude and longitude and altitude of each voxel separately;

recursively split each voxel from among the plurality of voxels to configure the multi-resolution voxel structure, wherein the multi-resolution voxel structure is created using a Bloom filter approach for reducing data size;

receive spatial data corresponding to the current location generated by at least one sensor associated with the autonomously operating entity;

using the spatial data, determine an occupancy status of one or more voxels from among the plurality of voxels configuring the 3D virtual construct, wherein the occupancy status of each voxel is determined from plurality of predefined categories based on the degree of density detected, wherein the occupancy status is determined from plurality of predefined categories comprising: an empty occupancy status for free space with no matter, a permanent occupancy status for solid matter that is permanent in time with high degrees of density, a temporary occupancy status for solid matter that is temporary in nature, a transient occupancy status for solid or semi solid matter that varies with time and has lower degrees of density, and a moving occupancy status for moving objects based on the spatial data received from the at least one sensor;

configure a voxel map from the 3D virtual construct based on the occupancy status of the one or more voxels; and generate a 3D map by overlaying visual semantic data onto the voxel map, the visual semantic data derived from image frames corresponding to the current location captured by one or more imaging devices associated with the autonomously operating entity, wherein the 3D map is capable of autonomously positioning the autonomously operating entity.

11. The positioning system as claimed in claim 10, wherein the positioning system is further caused to:

provide the 3D map to the autonomously operating entity for facilitating the autonomous positioning of the autonomously operating entity, wherein the 3D map corresponds to a high-definition 3D map capable of being dynamically updated to facilitate the autonomous positioning of the autonomously operating entity in substantially real-time.

12. The positioning system as claimed in claim 11, wherein the autonomously operating entity is configured to:

localize a surrounding environment associated with the current location using the 3D map; and autonomously navigate the surrounding environment based on the localization of the surrounding environment.

13. The positioning system as claimed in claim 10, wherein the 3D virtual construct corresponds to a grid of voxels configured by splitting the spatial volume into the plurality of voxels, and, wherein each voxel in the grid is associated with a unique voxel identification information.

14. The positioning system as claimed in claim 10, wherein a sensor from among the at least one sensor corresponds to a Light Detection and Ranging (LiDAR) sensor and, wherein the LiDAR sensor is one of a line-based LiDAR sensor and a Flash-based LiDAR sensor.

15. The positioning system as claimed in claim 14, wherein overlaying the visual semantic data onto the voxel map comprises matching of the visual semantic data with the spatial data received from the LiDAR sensor to define one or more objects present in the current location.

16. The positioning system as claimed in claim 10, wherein the autonomously operating entity corresponds to one of an autonomous vehicle, a robot and a drone.

17. An autonomously operating entity comprising:

a location determination unit configured to use signals received from one or more navigational satellites to determine a current location of the autonomously operating entity;

at least one sensor configured to generate spatial data corresponding to the current location;

one or more imaging devices configured to capture image frames corresponding to the current location; and a positioning system in operable communication with the location determination unit, the at least one sensor and the one or more imaging devices, the positioning system comprising:

at least one processing module, and a memory having stored therein machine executable instructions, that when executed by the at least one processing module, cause the positioning system to:

generate a three-dimensional (3D) virtual construct corresponding to the current location by splitting a spatial volume associated with the current location into a plurality of voxels, wherein each of the plurality of voxels is assigned a permanent address using a multi-resolution hierarchy, which serves as a unique voxel identification information, wherein each permanent address is referenceable at a centre point, with a latitude, a longitude, and an altitude, and wherein the unique voxel identification information for each voxel is represented by a plurality of information fields, wherein the plurality of information fields list a unique identification, latitude and longitude and altitude of each voxel separately;

recursively split each voxel from among the plurality of voxels to configure a multi-resolution voxel structure, wherein the multi-resolution voxel structure is created using a Bloom filter approach for reducing data size;

using the spatial data, determine an occupancy status of one or more voxels from among the plurality of voxels configuring the 3D virtual construct, wherein the occupancy status of each voxel is determined from plurality of predefined categories based on the degree of density detected, wherein the occupancy status is determined from plurality of predefined categories comprising: an empty occupancy status for free space with no matter, a permanent occupancy status for solid matter that is permanent in time with high degrees of density, a temporary occupancy status for solid matter that is temporary in nature, a transient occupancy status for solid or semi solid matter that varies with time and has lower degrees of density, and a moving occupancy status for moving objects based on the spatial data received from the at least one sensor;

configure a voxel map from the 3D virtual construct based on the occupancy status of the one or more voxels;

generate a 3D map by overlaying visual semantic data onto the voxel map, the visual semantic data derived from the image frames, wherein the visual semantic data is matched with the spatial data received from a LiDAR sensor to define one or more objects present in the current location; and autonomously position the autonomously operating entity using the 3D map.

18. The autonomously operating entity as claimed in claim 17, wherein each voxel from among the plurality of voxels is associated with a unique voxel identification information and, wherein the occupancy status of the one or more voxels is determined from plurality of predefined categories comprising:

an empty occupancy status, a permanent occupancy status, a temporary occupancy status, a transient occupancy status and a moving occupancy status based on the spatial data received from the at least one sensor.

* * * * *